A. RUCKGABER.
SPEED REGULATOR FOR PHONOGRAPHS.
APPLICATION FILED MAR. 6, 1914.

1,212,692. Patented Jan. 16, 1917.
4 SHEETS—SHEET 1.

WITNESSES
F. Hogg.
Jos. Bisband.

INVENTOR
Albert Ruckgaber
BY Karl P. Goepel
ATTORNEY

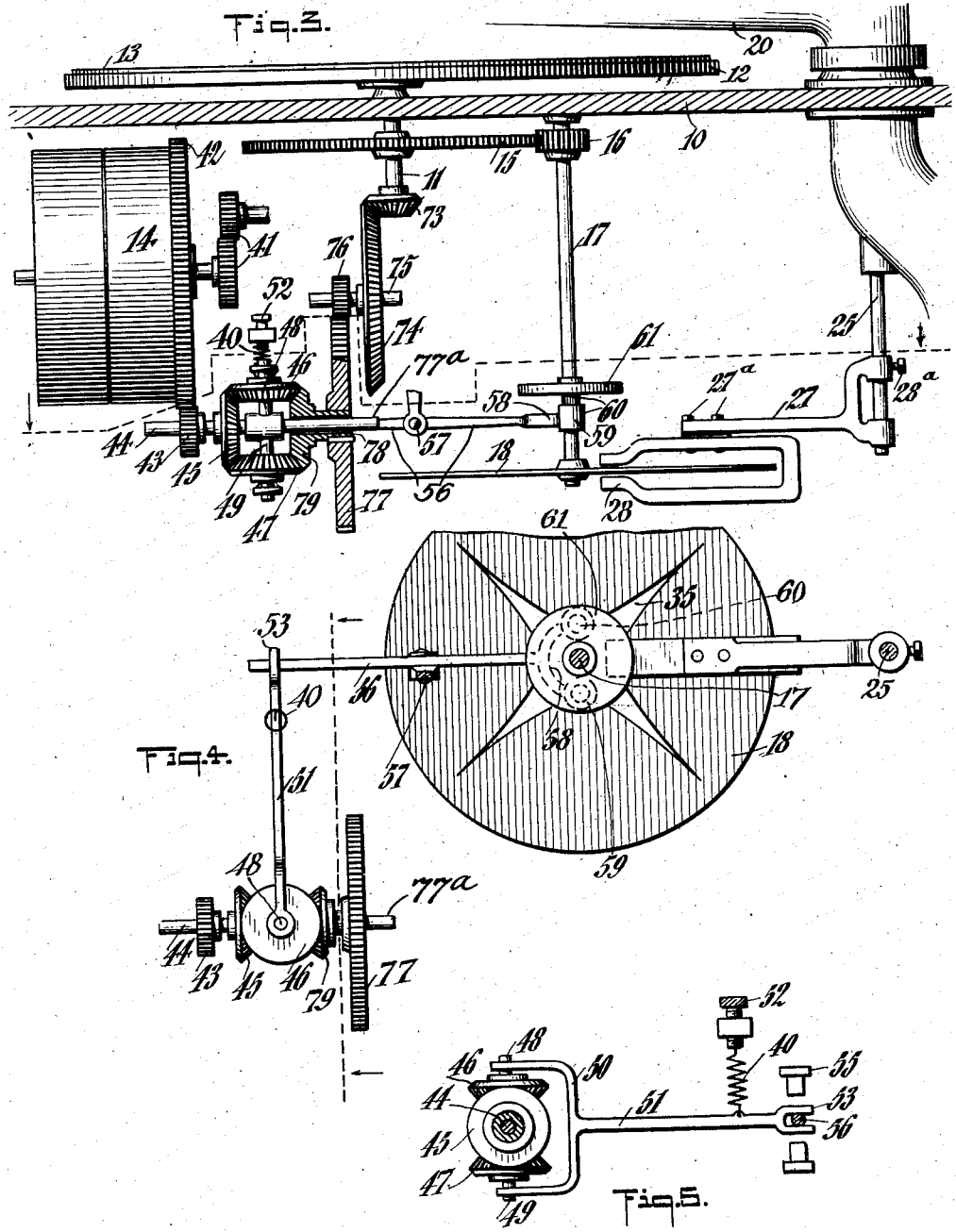

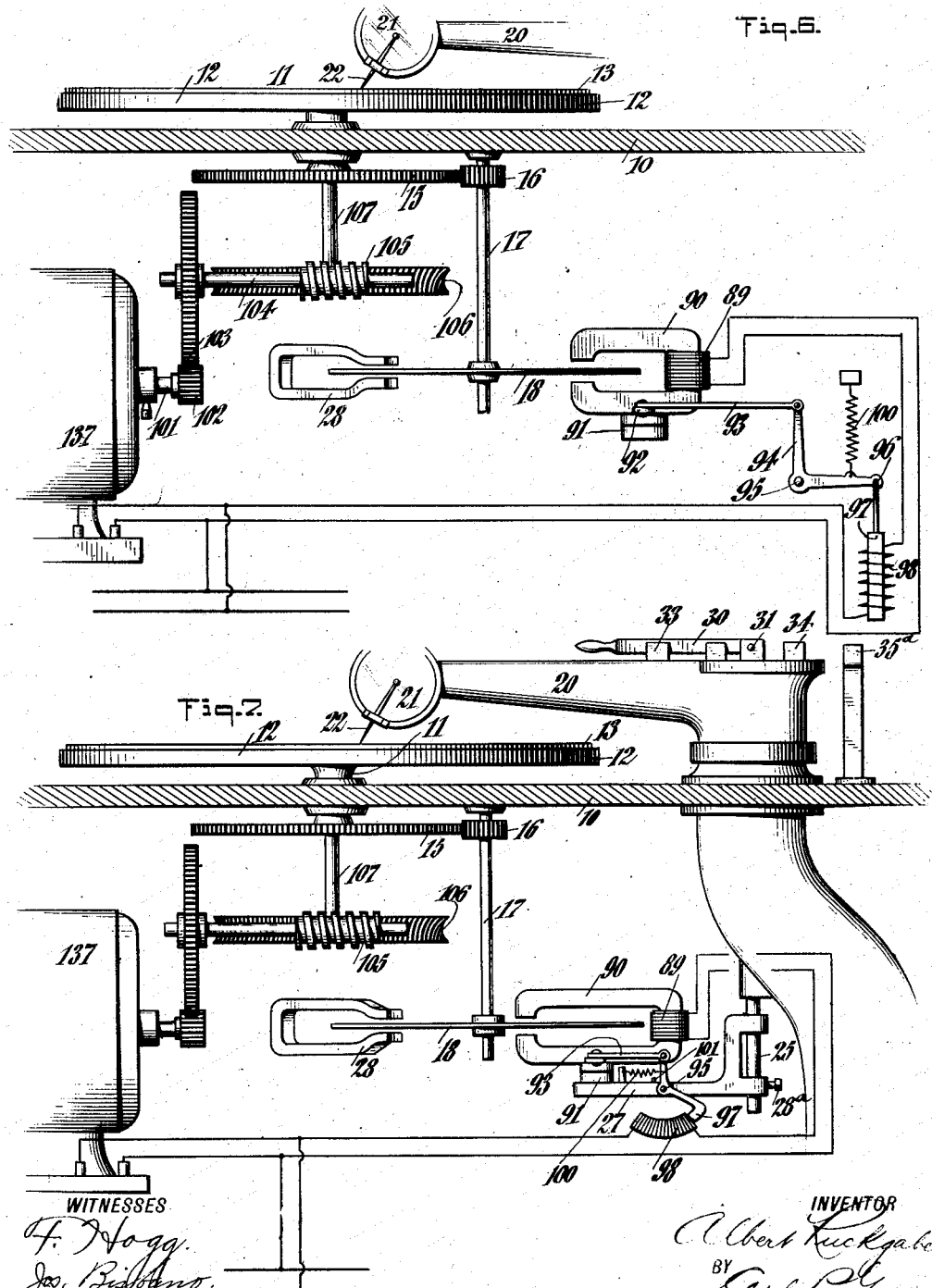

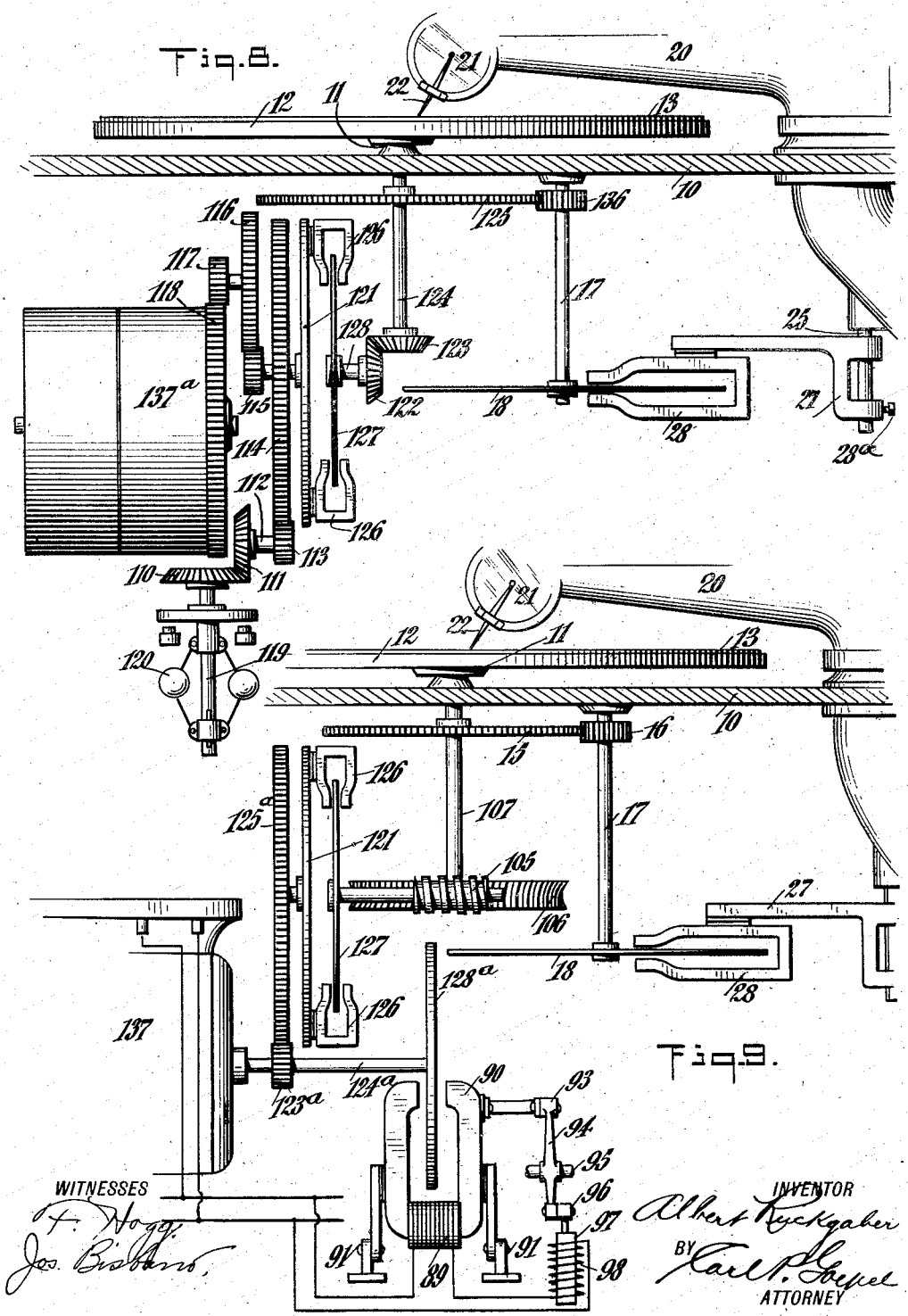

UNITED STATES PATENT OFFICE.

ALBERT RUCKGABER, OF BROOKLYN, NEW YORK.

SPEED-REGULATOR FOR PHONOGRAPHS.

1,212,692.   Specification of Letters Patent.   Patented Jan. 16, 1917.

Application filed March 6, 1914. Serial No. 822,933.

*To all whom it may concern:*

Be it known that I, ALBERT RUCKGABER, a citizen of the United States, and a resident of Brooklyn, county of Kings, State of New York, have invented certain new and useful Improvements in Speed-Regulators for Phonographs, of which the following is a specification.

This invention relates to phonographs, and more particularly to improvements therein the object of which is to provide means for the regulation of the speed of the record-disk.

The invention will be more fully described hereinafter and finally pointed out in the claims.

Figure 1:
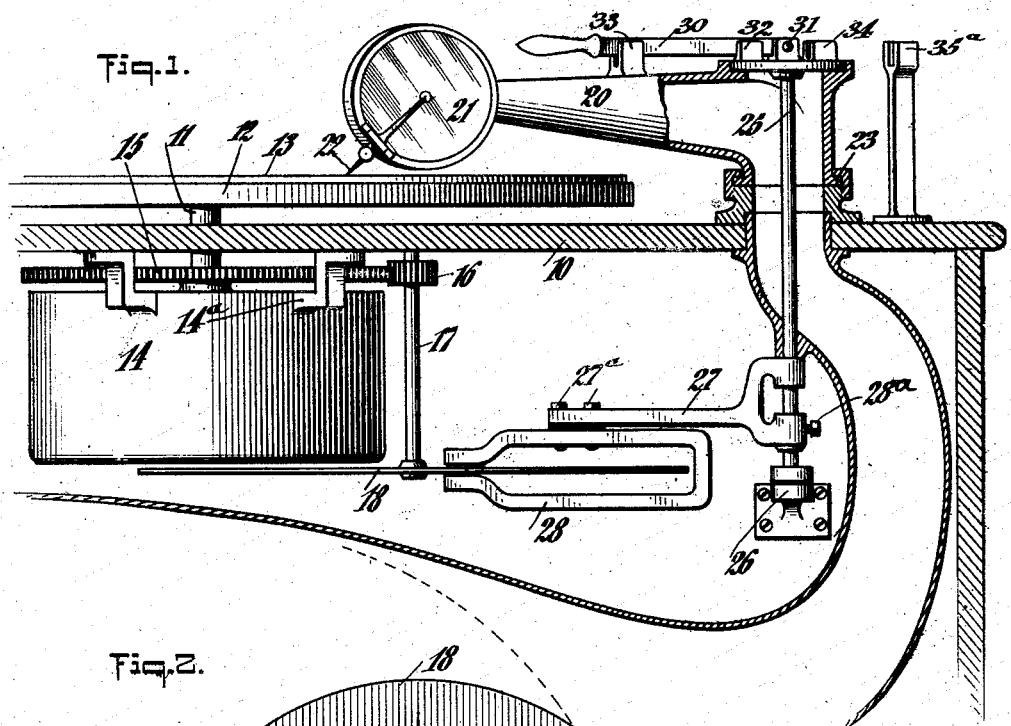
Figure 2:
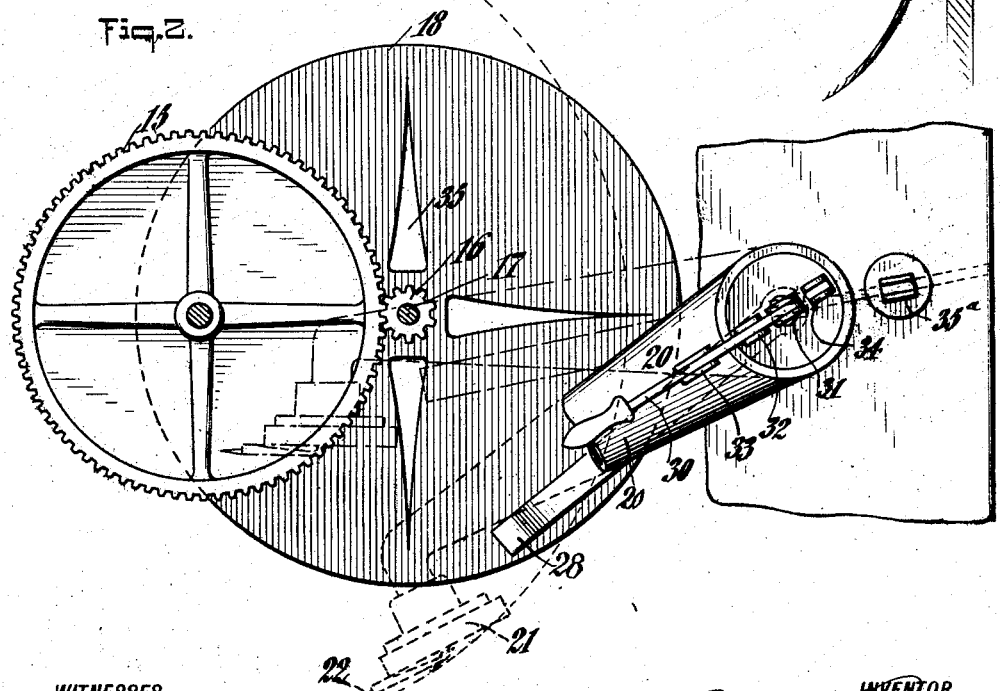

In the accompanying drawings, Figure 1 is a side-view, partly in section, of the essential parts of the phonograph necessary for the carrying out of my invention, Fig. 2 is a plan-view, Fig. 3 is a vertical side-view, with parts in section, of another embodiment of my invention, Fig. 4 is a partial plan-view of the embodiment shown in Fig. 3, Fig. 5 is a side-view of a detail part used in the embodiment shown in Fig. 3. Fig. 6 is a side-view of another embodiment in which an electric motor is used for rotating the disk, and showing the electric connections, Fig. 7 is another embodiment of the parts used in connection with the electric motor, also showing the electric connections, Fig. 8 is a side-view of another embodiment in which a magnetic clutch is used, and Fig. 9 is a side-view of another embodiment using a magnetic clutch.

Similar characters of reference indicate corresponding parts throughout the various views.

Referring to the drawings, and more particularly to Fig. 1, the frame 10 supports the rotary shaft 11 having the record-support 12 thereon, on which is seated the record-disk 13. The support 12 and record-disk 13 are rotated in the manner well known by means of a spring, not shown, in the casing 14 supported by suitable brackets 14ª, and by the unwinding of the spring the shaft 11 is rotated. To the shaft 11 is secured a gear 15, which meshes with a pinion 16 on a shaft 17, to which shaft a metal disk 18 is secured. With the exception of this disk 18 and the operating parts thereof, the parts are well known and as used heretofore, and may be changed as occasion arises. The metal disk 18 is provided and suitably secured to the shaft 17, in order to have the relative linear speed between the record-line and the stylus remain constant, or, otherwise stated, to have the angular speed increased or decreased according to whether the record commences at the periphery or near to the center of rotation. In order to have the stylus coöperate at the speed just stated, the swinging tone-arm 20, having its sound-producing member 21 at its free end and its stylus thereto secured, is movable at the bearing 23 as is well known, but has a shaft 25 supported in bearings 26 to which a support 27 is suitably secured by a thumb-screw or equivalent device indicated by 28ª. This bracket 27 supports the permanent magnet 28, which permanent magnet is regulated in its position by small thumb-screws 27ª. In order to lock the shaft 25 to the tone-arm 20, a locking-lever 30 is provided which is pivoted at 31, and engages the guide members 32 and 33, suitable other members 34 and 35ª being provided, into which the locking-member 30 is moved, in the event that the tone-arm is to be used in a manner different from that set forth heretofore, namely, in such a case where the record-disk is rotated, with a variable linear velocity of the record-line with respect to the stylus, and a constant angular velocity. By throwing the switch 30 into the members 34 and 35ª, the tone-arm 20 is free to rotate in the bearings 23, but the magnet 28 is gripped and hence it will be fixed in position in respect to the metal disk 18. But if the locking member 30 is thrown into action with the members 32 and 33, then the shaft 25 is locked thereto, and the magnet 28 is caused to move correspondingly with the tone-arm.

The spring in the casing 14 serves to rotate, through the intermediate mechanism described, the metal disk 18 and also the record-disk 13. As, however, it is desired to have a constant linear velocity of the record-line with respect to the stylus when using the disk for reproducing the selection, it is first necessary to fix the mechanism that the disk will revolve with the same velocity with which the original or master record was made. Thereafter the stylus is placed on the record-disk, either at its periphery and caused to follow the record-line inwardly, or it is placed at the interior portion of the record-disk and caused to follow the record-line outwardly, until near the periphery of the record-disk.

In order to maintain this desired velocity constant throughout the rendering of the piece to be played, it is necessary to provide a braking means, which will maintain the linear velocity of the record-line with respect to the stylus constant. For this purpose the magnet is caused to move correspondingly to the tone-arm 20, and as the magnet moves inwardly the drag on the disk is diminished and the angular velocity of the record is increased, in order to maintain the linear velocity of the record-line with respect to the stylus constant, assuming that the stylus moves inwardly. The metal disk is provided with openings of suitable configuration. These openings are shown in Fig. 2 and indicated by 35, and may be given any suitable configuration to be determined by experiment for the purpose of correcting the effects of varying friction, windage, etc. The object of these corrections is, that the speed of rotation of the record will give a constant linear velocity of the record-line with respect to the stylus for all positions of the stylus.

If the unwinding of the spring contained in the casing and used for the purpose of driving the record-disk, gives a constant torque, the movement of the magnet traveling over the disk toward the center will cause the drag to diminish, but as the driving torque is constant, by supposition, the angular velocity of the disk will increase, until the increased drag caused by the increased speed, multiplied by the distance the magnet is from the center of the disk, (or the magnet torque-arm) plus the friction torque, is equal to the driving torque moment of the spring. This follows because the drag on the disk rotating between the jaws of the permanent magnet is proportional to the strength of the magnet, the number of revolutions per minute of the disk, and to the magnet torque-arm. As the strength of the permanent magnet is a constant for any given case, the torque moment is therefore proportional to the product of the number of revolutions per minute by the torque-arm. Therefore the speed of revolution of the disk will increase in proportion to the amount the torque-arm of the magnet is shortened. As this spring does not give a constant torque, it is necessary to compensate for the change in order to have an effective constant torque. The counter-torque will have to be a variable one, and must be controlled independently of the speed. The magnitude of the counter-torque, exerted at any instant, should depend upon the torque of the spring at that time. It is therefore necessary to arrange a mechanical element which will measure this torque. Such a device is shown in Fig. 3, and is of the nature of a transmission dynamometer, and therefore the pressure exerted by the end of the dynamometer-arm is proportional to the torque. This pressure is utilized to give a counter-torque or drag which will be independent of the speed. One way would be to employ a magnetic drag on the disk, but as this varies with the speed, the drag would not be independent of the speed. For this purpose the casing 14, containing the spring, is arranged to be wound up by means of the intermittent mechanism 41, as shown in Fig. 3, and is provided with a gear-wheel 42, which meshes with a pinion 43 on a shaft 44. To this shaft 44 is secured a bevel gear-wheel 45, which meshes with a gear-wheel 46 and another gear-wheel 47, both of which gear-wheels 46 and 47 are rotatable on shafts 48 and 49 suitably supported by a yoke 50 having an extension 51, to which the spring 40 is secured, and which spring 40 has its other end attached to an adjustable member 52, whereby the tension of the spring 40 may be regulated. The end 53 of the arm 51 is movable between members 55 to limit the movement thereof. The end 53 engages the rod 56, which is suitably pivoted at 57, and the free end of which is provided with a yoke 58, at the ends of which holders 59 are secured, to which friction members 60 are secured which are adapted to press against the friction-disk 61 secured to the shaft 17, on which shaft the metal disk 18, passing through the permanent magnet 28 supported on the member 27 of the shaft 25, is mounted. This shaft 25 passes through the tone-arm 20 and is rotated in accordance with the movement of the tone-arm. The shaft 17 is rotated by means of mechanism consisting of the pinion 16 meshing with the gear 15 secured to the record-disk shaft 11, which has a bevel gear 73 meshing with the bevel gear 74 on a shaft 75, to which shaft 75 a pinion 76 is secured, which meshes with the gear 77 on a shaft 77ᵃ secured to a loose sleeve 78 having a bevel gear 79, which bevel gear 79 is rotated by means of the intermeshing with the gears 46 and 47. As the gear 42 is rotated, the pinion 43 and shaft 44 are rotated in correspondence therewith and transmit their motion through the intermediate gears 46 and 47 to the gear 79, gear 77, pinion 76, gear 74, gear 73, shaft 11, gear and pinion 15 and 16, and to the shaft 17, and thereby move the metal disk 18.

The connection of the dynamometer in the above described manner causes the torque of the spring to produce a counter-torque by means of the friction-disks. This counter-torque depends upon the pressure and is independent of the speed. The pressure of the spring 40 is regulated by means of the adjustable member 52, so that any driving torque above the desired torque will overcome the action of the spring 40 and produce a substantially equal counter-frictional torque. The equilibrium will be attained when the driving torque is exactly equal to the sums of the magnetic torque, the counter-frictional torque caused by the dynamometer, and the frictional torque caused by the friction of the parts. These frictional torques are practically independent of the speed. The magnetic drag or torque is a constant, as has been set forth. Hence there is always a constant effective torque, since the torque moment of the spring minus the counter-frictional torque caused by the dynamometer, which difference is the effective torque, is equal to the sum of the magnetic drag or torque and the torque of the friction in the bearings and of the air, as set forth. Since the magnetic drag or torque is a constant and since the friction caused by the bearings and the air is practically a constant, the effective torque will also remain a constant.

As the effective torque is constant, the effect of the movement of the magnet 28 toward the center of the disk 18 is to permit the increase of the speed of revolution of the disk 18 in inverse proportion to the distance of the magnet 28 from the center of the disk 18, if the disk is solid. However, to produce the desired variation in the angular velocity, and to secure the desired constant linear velocity, cuts 35 are made in the metal disk 18 so as to remove some of the material and to reduce the drag. The disk 18 may be of magnetic or non-magnetic material.

If it is desired to use an electric motor instead of a spring, the arrangement shown in Figs. 6, 7, and 9 may be installed. Heretofore the difficulty of using an electric motor to operate a phonograph resided apparently in the variation of speed with the voltage changes. Thus, a change from 100 to 105 volts, or 5%, would mean an increase of speed of the same amount, whether the motor is shunt or series wound. This will, of course, be very noticeable in the pitch of the sound of phonographs. In order to counteract this change in the voltage, it is proposed to use a series motor, and to use in the place of the present ball-governor, a metal disk revolving between the poles of a permanent magnet to act as a load, which has been heretofore described. This magnet, in this particular case, would be fixed in relation to the disk by trial or experiment. If the voltage remains constant, the conditions are uniform and the motor will run at the proper speed. If, however, the voltage should change, the speed will increase in proportion, and for this reason the disk is used with the permanent magnet, together with another compensating magnet, either permanent or electric, to increase or decrease the load on the motor sufficiently to restore, or rather maintain, the uniform speed. In order to increase or decrease the load, it will not be sufficient to simply use a compensating electromagnet, fixed in position, as the change of voltage, while increasing the drag in proportion to the square of the change of voltage, will not sufficiently load or unload the motor to maintain the original speed. It is therefore necessary, in order to increase or decrease the drag sufficiently, to vary the position of the compensating magnet with reference to the disk. For this purpose the electromagnet is provided, which is shown clearly in Fig. 6, and indicated by 90. This electromagnet 90 is pivoted and movable on the bearing 91, and has an arm 92 extending therefrom suitably secured to an arm 93, which is pivotally connected with the bell-crank lever 94 pivoted at 95, and having its free end 96 secured to the core of a solenoid 98. Thus, as the voltage increases, the current in the solenoid will be increased in proportion, which increase will move the core 97 slightly, and hence move the magnet 90 on its bearing 91 in respect to the metal disk 18. The electromagnet is thus moved toward or away from the center of the disk 18 by means of the core 97 and the solenoid 98, while the proper reverse movement is supplied by the spring 100, and in this manner the increase or decrease of the voltage is counterbalanced by a corresponding increase or decrease in the drag of electromagnet 90. It is desirable to have a permanent magnet 28 to act as a constant brake upon the metal disk 18, so that if the current, through the coils 89 of the electromagnet 90, suddenly ceases, the mechanism will not attain a dangerous speed. This permanent magnet 28, however, merely acts as a safety-brake, and its effect should not be made large. The metal disk 18 is secured to the shaft 17 having the pinion 16 and meshing with the gear 15, and the table 12 with its record-disk 13 and shaft 11, are arranged in a manner similar to that shown in Fig. 1. The motor-shaft 101 of the motor 137 has a pinion 102 meshing with a gear 103 to which is secured a shaft 104 having a worm 105 secured thereto, meshing with a worm-gear 106; the shaft 107 is secured to the gear 15. The permanent magnet is shown in Fig. 6, and indicated by 28.

In Fig. 7 is shown the electric motor applied to a machine for giving a constant linear velocity of the record-line with respect to the stylus and this again has a permanent magnet 28 for the safety load, and has the magnet 90 with an energizing-coil 89 connected with the main line, and has the bearing 91 of the magnet 90 suitably supported by the movable bracket-support 27 secured by the screw 28ª to the shaft 25, which rotates correspondingly with the tone-arm 20, having the sound-producing mechanism 21 and the stylus 22. The electromagnet 90 is moved by means of the core 97 moving within the solenoid 98, the core being pivoted at 95 and is connected with the link 93, the movement of the magnet being restrained by the stop 101 and the reverse movement being produced by the spring 100.

In Fig. 8 is shown another embodiment of my invention which uses a magnetic clutch. The spring motor 137a rotates the gear 118 which meshes with a pinion 117, thus causing the gear 116 to rotate, and actuate the pinion 115, which is on the same shaft as the gear 114, and also the disk 121 carrying the two permanent magnets 126 having between their poles a metal disk 127, which may be made of a magnetic or non-magnetic material. The rotation of the magnets 126 causes the disk 127 to rotate with them at a lower speed, depending upon the load upon the mechanism. The disk 127 turns the bevel gear 122 by means of their common shaft 128. The bevel gear 122 meshes with the bevel gear 123 upon the shaft 124, which is connected with the shaft 11 of the turntable 12 upon which the record-disk 13 is mounted, as before set forth. Upon the shaft 124 is the gear 125 that meshes with the pinion 136 which is upon the shaft 17. This shaft also carries the disk 18 revolving between the poles of the permanent magnet 28. By means of these connections, the rotation of the disk 127 by the motor 137a causes the rotation of the disk 18 between the poles of the magnet 28, which produces a drag or load upon the mechanism that determines the speed of rotation of the disk 127. The gear 114 meshes with the pinion 113 upon the shaft 112 that carries the bevel gear 111 meshing with the bevel gear 110 upon the shaft 119. This shaft has the ball-governor 120, so that a constant speed of rotation of the motor-shaft, hence of the magnets 126, is maintained. The permanent magnet 28 is connected to the tone-arm, as has been set forth.

In Fig. 9 another embodiment of my invention is shown, in which the series electric motor 137 rotates the shaft 124a. On this shaft is the pinion 123a meshing with the gear 125a, which rotates the disk 121 on which are mounted the magnets 126, which form a magnetic clutch with the disk 127, as has been set forth. The disk 127 actuates the worm 105, which meshes with the corresponding worm-gear 106 on the shaft 107 and rotates the turntable 12 and the record-disk 13, as has been set forth. On the shaft 107 is mounted the gear 15 which meshes with the pinion 16 mounted upon the shaft 17. On this shaft 17 is mounted the disk 18 revolving between the poles of the permanent magnet 28, which is secured to the tone-arm by means of the bracket 27, as has already been set forth. On the shaft 124a is also mounted the disk 128a revolving between the poles of the electro-magnet 90 energized by the coil 89 and pivoted in bearings 91. This electro-magnet 90 is caused to swing by the movement of the core 97 in the solenoid coil 98, which is connected to the electromagnet 90 by means of the lever 96 connected to the lever 94 pivoted at 95 and attached to the lever 93. The reverse movement of the electromagnet 90 is supplied by a spring, as has already been set forth, and shown for instance, by the reference character 100 in Fig. 7. The electromagnet 90 is thus moved toward or away from the center of the disk 128a as the voltage is increased or decreased, thus counteracting the effect of the increased or decreased voltage, in increasing or decreasing the speed of rotation.

I have described several embodiments of my invention, but changes may be made therein without departing from the spirit of the invention as defined in the appended claims.

I claim:

1. In a phonograph having a record-disk, a movable tone-arm, means for moving the record-disk, a rotary member rotated with the record-disk, and means movable by the tone-arm, the last-named means and rotary member being movable in respect to each other, and being in magnetic relation with respect to each other, for the purpose of regulating the speed of the record-disk.

2. In a phonograph having a record-disk, means for moving the same, a tone-arm, a rotary member rotatable with the record-disk, and a magnetic member movable by the tone-arm in respect to the rotary member, thereby causing a braking action on the rotary member.

3. In a phonograph, the combination of a record disk, means for moving the same, and a stylus relatively movable to said record disk, with a member movable with said record disk, and a magnetic member coacting with said first-named member and in magnetic relationship therewith, one of said members being movable in respect to the other, the action of said magnetic member upon said first named member being automatically changed to correspond with, and to compensate for, any tendency to change the relative linear velocity of the record line to the stylus from a predetermined relative linear velocity of the record line to the stylus, so as to obtain a predetermined linear velocity of the record line in respect to the stylus at any position of the stylus in respect to the record line.

4. In a phonograph having a stylus, a record-disk, and means for moving the same, a rotatable metallic member rotating with the record-disk, and a magnetic member, movable in respect to the metallic member, and means for causing the movement of the magnetic member in respect to the metallic member to correspond to the movement of the stylus in respect to the record-disk.

5. In a phonograph having a stylus, a record-disk, and means for moving the same, a metal braking disk moved by said means, a magnetic braking member coöperating with said metal disk, a support for the stylus, a support for the magnetic braking member, and a connecting member for the stylus and braking-member supports.

6. In a phonograph having a stylus, a record-disk, and means for moving the same, a metal braking disk moved by said means having a cut-out portion, a magnetic braking member coöperating with said metal disk and with said cut-out portion, and means connecting the stylus with the braking member for causing the movement of the braking member in respect to the metal disk to correspond with the movement of the stylus in respect to the record-disk.

7. In a phonograph having a stylus, a record disk, and means for moving the record disk, transmission means between said means and the record disk, a magnetic clutch interposed within said transmission means, a metal disk movable by said transmission means, a magnetic braking member coöperating with said metal disk; and means connecting the stylus with the magnetic braking member for causing the movement of the said braking member with respect to the metal disk to correspond with the movement of the stylus with respect to the record disk.

8. In a phonograph having a stylus, a record-disk, and a series electric motor, transmission means between the electric motor and the record-disk, a magnetic clutch interposed within said transmission means, a metal disk movable by said transmission means, a magnetic braking member coöperating with said metal disk, and means connecting the stylus with the magnetic braking member for causing the movement of the braking member in respect to the metal disk to correspond with the movement of the stylus in respect to the record-disk.

9. In a phonograph having a stylus, a record-disk, and a series electric motor, transmission means between the electric motor and the record-disk, including a magnetic clutch, a metal disk movable by said transmission means, a magnetic braking member coöperating with said metal disk, means connecting the stylus with the magnetic braking member for causing the movement of the braking member in respect to the metal disk to correspond with the movement of the stylus in respect to the record-disk, and means for varying the load on the motor in order to maintain the desired velocity of the record-disk independent of any fluctuation in the voltage of the supply-circuit to the motor.

10. In a phonograph having a record disk, a reproducing member movable relatively to the record disk, means for moving the record disk, a rotary member rotated with the record disk, and magnetic means movable in respect to said rotary member, and during its movement in magnetic relationiship with said rotary member, the movement of the magnetic member relatively to the rotary member corresponding with the movement of the reproducing member relatively to the record disk.

11. In a phonograph having a record disk, a stylus coacting therewith, a rotary member, and means movable by the stylus and movable in respect to the rotary member, and in magnetic relationship therewith.

12. In a phonograph, the combination of a record medium, a medium coacting therewith, and members magnetically coacting with each other, with means for changing the position of one of said magnetically coacting members relatively to the other, upon the change of position of the said coacting medium on the record medium, and means whereby a change of the relative linear velocity of the record medium and coacting medium at the coacting point is produced, on the change of position of one of the magnetically coacting members relatively to the other.

In testimony, that I claim the foregoing as my invention, I have signed my name in presence of two subscribing witnesses.

ALBERT RUCKGABER.

Witnesses:
F. Hoeg,
Jos. Bisband.